Aug. 28, 1956   D. E. RAE   2,761,131
RADAR SYSTEMS
Filed Feb. 21, 1952   2 Sheets-Sheet 1
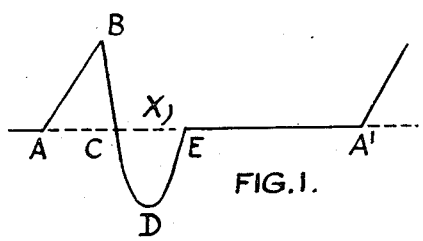
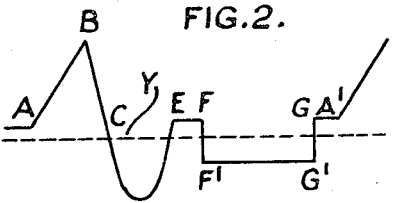
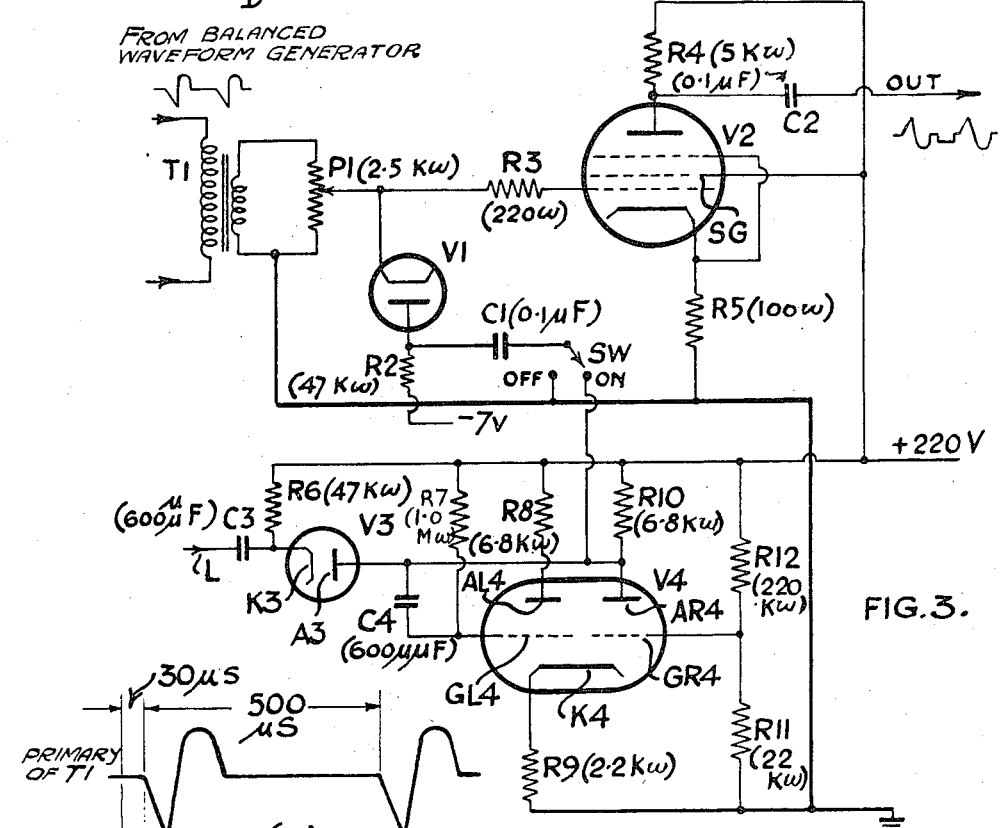
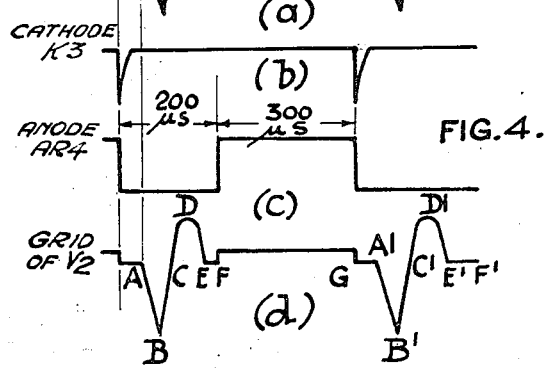
Inventor:
Douglas Elliot Rae;
By his attorneys,
Baldwin & Wight

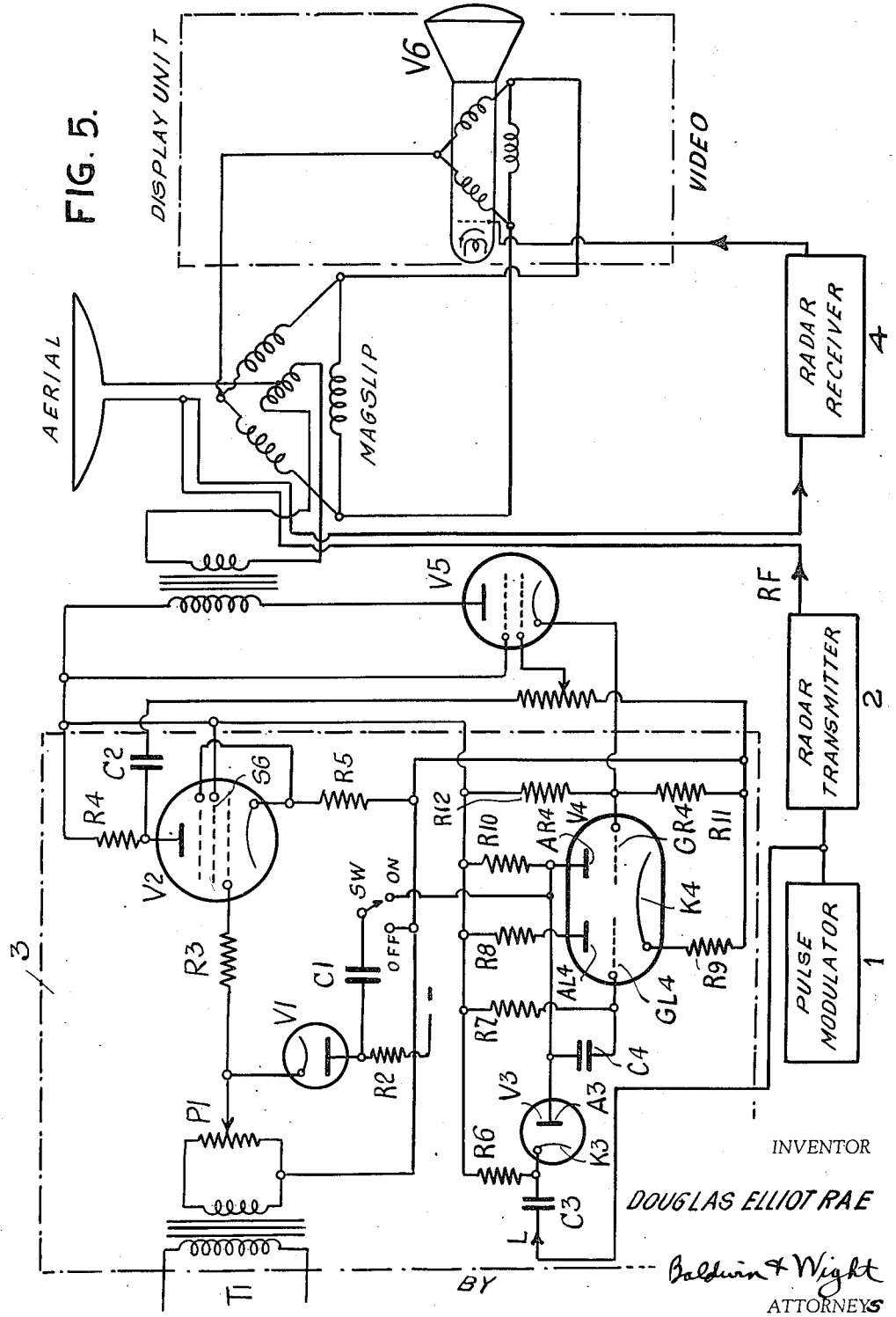

United States Patent Office 2,761,131
Patented Aug. 28, 1956

2,761,131

RADAR SYSTEMS

Douglas Elliot Rae, Leaden Roding, near Dunmow, England, assignor to Marconi's Wireless Telegraph Company Limited, London, England, a company of Great Britain Application February 21, 1952, Serial No. 272,727

4 Claims. (Cl. 343—11)

This invention relates to radar systems employing the P. P. I. (plan position indicator) type of display i. e. the type of display in which the cathode ray in a display cathode ray tube is deflected simultaneously radially and circularly, the radial distance of a target indication along the radial line of deflection indicating the range of the target and the direction of said indication from the center of the tube screen indicating the azimuth of the target. As is well known the azimuthal or circular deflection is effected in correspondentce with the varying directivity of the radar system—normally in synchronism with the rotation of a rotating aerial—and the range or radial deflection is effected by a time base circuit. In general the azimuthal deflection is through a complete circle of 360° but, if desired, it may be in a limited sector only.

Normally, in a radar system with a P. P. I. type of display, the radial deflection along which range is indicated starts at the center of the tube screen. It is, however, often desired to provide what is termed "an expanded center," utilizable at will, in the display. When the expanded center is in use, range of a target is indicated, not by the radial distance of a target indication from the center of the tube screen but by the radial distance from a (temporary) zero range circle having the tube screen as center. Thus, when the expanded center is in use the indications of target azimuths remain unchanged and the indicated ranges remain the same but these ranges are measured, not from the center of the screen but by their radial distances from the temporary zero range circle the center of which coincides with the center of the tube screen. The advantage of the expanded center display is that, in direct proportion to the amount of expansion—i. e. the radius of the zero range circle—the circumferential spacing between targets is increased, thereby making targets at adjacent azimuths and approximately similar ranges more readily distinguishable from one another on the screen.

There are numerous known methods of providing for expansion of the center of the display given by various different designs of radar system, but considerable practical difficulties have been experienced in making such provision in those known and practically desirable forms of radar system in which the display unit employs a fixed deflector coil to which is supplied a so-called "balanced" wave form and whose time base (producing the radial deflection) is initiated or triggered from the normally provided modulator which causes the system to transmit a radio pulse. Indeed, these difficulties have been such that, hitherto, expansion of the center has not been provided in practice in systems having display units of this form. The present invention seeks to provide reliable and simple means for giving center expansion in such cases. For the sake of brevity a system having a display unit of this form will hereinafter be referred to as a system having a fixed deflector coil modulator-controlled balanced wave form P. P. I. display unit.

According to this invention a radar system having a fixed deflector coil modulator-controlled balanced wave form P. P. I. display unit comprises means, operable at will, for superimposing a pulse component upon the normal balanced wave form so as to shift the mean average level of the resulting composite wave form to a value different from that at which the substantially rectilinear time base deflecting part of said wave form commences.

Preferably the unbalanced pulse component is a rectangular pulse generated by a pulse generator triggered by a synchronizing pulse provided in predetermined time relationship with the operation of the normally provided modulator of the system.

Preferably also the pulse generator is a multi-vibrator having one stable state and adapted to be triggered to its other state by the synchronizing pulse and to remain in that other state for a predetermined time.

The invention is illustrated in and further explained in connection with the accompanying drawings in which Fig. 1 is a typical balanced wave form as employed in known radar systems of the form to which the present invention relates; Fig. 2 shows the wave form of Fig. 1 modified in accordance with this invention, by the superimposition of a pulse component; Fig. 3 is a circuit diagram illustrating one embodiment of this invention; Fig. 4 is a graphical figure showing typical wave forms obtained at different parts of the circuit of Fig. 3; and Fig. 5 shows a typical application of the system of the invention.

Referring to Fig. 1, this shows a typical balanced wave form as at present used in radar systems of the form to which the invention relates. The point A of this wave form occurs at the instant the modulator is "fired" and the rectilinear portion AB represents the rectilinear rise of current in the deflector coil for producing radial deflection. It is during this rise that the cathode ray in the display tube is "brightened." The area CDE of the wave form is, in known practice, exactly equal to the area ABC the average level being indicated by the broken line X. The deflector coil is of course in a closed circuit with the stator of the so-called aerial magslip (or equivalent device producing an electric output in correspondence with the movement of the normally provided aerial) in which the wave form of Fig. 1 is induced by transformer action and, therefore, the current between the points E and A', the latter being the start of the next wave form, is always zero and during this period the cathode ray is undeflected, being incident at the center of the tube screen, the sweep revolving in synchronism with the aerial about this center.

The present invention provides an expanded center (when required) by ensuring that the spot is displaced from the screen center at the moment when the modulator is fired so that at the instant corresponding to points A, A' . . . and so on, current is already flowing in the deflector coil. (Since the ray is only brightened at A the spot will not be visible until this time.) This is done, in carrying out the invention, by superimposing upon the wave form of Fig. 1 a pulse component so as to produce a resultant wave form as typified by Fig. 2. As will be seen the addition consists of a negative current-time area F, F', G', G between E and A' and the result of this addition is to shift the average level, i. e. the zero current abscissa line, now indicated at Y, negatively with respect to EA. Accordingly at points A, A' . . . and so on current flows through the coil so that an expanded center effect is obtained, the amount of expansion—i. e. the radius of the zero range circle—depending upon the value of this current.

Fig. 3 shows a circuit for achieving the wave form of Fig. 2 from that of Fig. 1. Referring to Fig. 3 a balanced wave form—actually, as indicated, the inverse of the wave form of Fig. 1—is produced in the known way (e. g. at the anode of a valve in so-called Miller connection), and applied across the primary of a transformer T1 which may conveniently have a step-down ratio of 10 to 1 and which provides the anode load of the Miller connected valve. An adjustable proportion of the secondary voltage from this transformer is taken via the slider of a potentiometer P1 and applied, if desired, through a grid stopper resistance R3, to the control grid of a valve V2 which is shown as a pentode and whose cathode is earthed through a resistance R5. The output from valve V2 is coupled out by resistance-capacity coupling elements R4, C2 and fed via the grids of the normally provided output voltages (not shown) which feed the rotor of the normally provided aerial magslip (not shown). The screen grid SG is connected to a suitable HT source. As so far described the apparatus would merely supply, at the output lead OUT, a wave form as shown in Fig. 1, i. e. the wave form fed in to the transformer T1 but inverted. The output valves supply, as already stated, the rotor of the aerial magslip the stator of which feeds the deflector coil (not shown).

There is, however, also provided a rectangular wave generator including the double triode V4. The right hand anode (as shown) AR4 of this valve is connected through a resistance R10 to the HT source and is also connected to the anode A3 of a diode V3 whose cathode K3 is connected through resistance R6 to the HT source and also coupled through condenser C3 to a lead L. On this lead is applied from the modulator (not shown) a pulse which is timed to arrive at the cathode K3 about 30 micro-seconds before the commencement of the linear fall of voltage across the transformer T1. The left hand anode AL4 of the valve V4 is connected to HT through a resistance R8 while the left hand grid GL4 is connected to the same point through a resistance R7 and is also coupled to the anode A3 of the diode V3 through condenser C4. The right hand grid GR4 is connected to the junction point of two series resistances R12, R11 connected between the HT terminal and earth while the common cathode K4 is returned to earth through a resistance R9. The anode AR4 of valve V4 is connected to the "on" contact of a two position switch SW, the "off" contact of which is earthed and the armature of which is connected through a condenser C1 to the anode of a diode V1 whose cathode is connected to the slider of a potentiometer P1. A suitable negative potential is applied to the anode of this diode through a resistance R2. With the switch SW in the position shown an expanded center effect is obtained, the output being as indicated near the output lead OUT. With the switch in its other position the apparatus shown in the lower half of the figure is ineffective and no expanded center effect is obtained. Typical circuit element values and applied voltage values are indicated conventionally, and by way of example only, in Fig. 3.

With this arrangement the wave form applied to the transformer T1 is as indicated at (a) in Fig. 4 and 30 micro-seconds before its commencement, a synchronizing signal, as indicated at (b) in Fig. 4 is applied through diode V3 to the right hand anode AR4 of valve V4. As will be seen this valve is connected as a cathode-coupled monostable multi-vibrator with its stable condition that in which the left hand section conducts, for the left hand grid GL4 is connected to HT through resistance R7. When the synchronizing signal of Fig. 4 (b) arrives, valve V4 is in its stable state but this signal triggers the valve by cutting off the left hand section. The circuit time constants are such that this unstable condition—with the left hand section of V4 cut off—is maintained for about 200 micro-seconds so that, for this period there is formed a negative going voltage-time area of about 100 volts amplitude. The valve V4 then assumes its stable state so that the negative going area is followed by a positive going area of 100 volts amplitude and 300 micro-seconds duration if, as is assumed in Fig. 4, the whole period is of 500 micro-seconds. Fig. 4 (c) shows the wave form on the anode AR4.

This wave form (Fig. 4 (c)) is applied to the anode of diode V1 which is assumed held at a D. C. potential of −7 volts. During the period A to F the voltage on the cathode of V1 never falls below −7 volts and hence, during this time the diode V1 is cut off. During the period F to G however the positive going voltage on the anode AR4 of the valve V4 causes the said diode to conduct and its cathode to rise in potential. This rise is applied to the control grid of valve V2 which accordingly superimposes a pulse component on the wave form fed in from transformer T1 to produce the required resultant wave form of Fig. 4 (d).

Referring to Fig. 5, the pulse modulator contained in block 1 modulates the radar transmitter in block 2 from which the radio frequency is fed to the rotating aerial. The modulation pulses are passed as synchronizing pulses to the input condenser C3 in the circuit arrangement as illustrated in Fig. 3 and indicated as being contained in block 3. The output from the circuit illustrated in Fig. 3 is taken as illustrated in Fig. 5 from condenser C2 to a potentiometer feeding the output valve V5. The output valve is transformer coupled to the rotor of a magslip, this rotor being rotated by the aerial. In circuit with the magslip is the deflecting coil arrangement on the display cathode ray tube V6 for providing the balanced wave form. Received signals from the aerial are fed to the radar receiver in block 4. From the output of this receiver video signals are passed to the modulator electrode at the display tube V6. Reference is made to the text "Cathode Ray Tube Displays," by Soller, Starr and Valley, volume 22, first edition, published by McGraw-Hill in the Radiation Laboratory Series, Section 13.11, page 464, Fig. 13. This disclosure, read in connection with paragraph 3, page 465, of the text, explains the circuit arrangement to which the instant invention is applied as illustrated in Fig. 5 in this application.

While I have described my invention in certain preferred embodiments, I realize that modifications may be made and I desire that it be understood that no limitations upon my invention are intended other than may be imposed by the scope of the appended claims.

I claim:

1. In a radar system having a plan position indicator display unit employing a fixed deflector coil to which is supplied a balanced wave form comprising a sawtooth portion and an equal area balancing portion, and whose time base, producing the radial component of the P. P. I. display, is initiated from a modulator which causes the system to transmit a radio pulse, said wave form including a substantially rectilinear time base deflecting portion and another portion, means, operable at will, comprising a rectifier device in circuit with an amplifier of said linear time base, means to apply a rectangular wave form to said rectifier device whereby there is superimposed a pulse component upon said balanced wave form between the balanced wave form and the start of the next sweep whereby the mean average level of the resulting composite wave form may be shifted to a value different from that at which the substantially rectilinear time base deflecting portion of said wave form commences.

2. A system as claimed in claim 1 wherein the unbalanced pulse component is a rectangular pulse generated by a multivibrator triggered by a synchronizing pulse provided in predetermined time relationship with the operation of the normally provided modulator of the system.

3. A system as claimed in claim 1 wherein the multivibrator has one stable state and connected and arranged to be triggered to its other state by the synchronizing pulse and to remain in that other stage for a predetermined time.

4. A system as claimed in claim 1 wherein the unbalanced pulse component is a rectangular pulse generated by a multivibrator triggered by a synchronizing pulse provided in predetermined time relationship with the operation of the normally provided modulator of the system, said multi-vibrator having one stable state and connected and arranged to be triggered to its other state by the synchronizing pulse and to remain in that other stage for a predetermined time.

References Cited in the file of this patent

UNITED STATES PATENTS

| | | |
|---|---|---|
| 2,300,189 | Wolff | Oct. 27, 1942 |
| 2,441,246 | Miller | May 11, 1948 |

OTHER REFERENCES

"Cathode Ray Tube Displays" by Soller, Starr and Valley, vol. 22, Radiation Lab. Series; publisher McGraw-Hill, pages 451 and 452 and 454–457.